(12) United States Patent
Rosales et al.

(10) Patent No.: US 12,018,517 B2
(45) Date of Patent: Jun. 25, 2024

(54) MOTOR VEHICLE LATCH ASSEMBLY WITH MANUAL RELEASE

(71) Applicant: Brose Schlieøsysteme GmbH & Co. Kommanditgesellschaft, Wuppertal (DE)

(72) Inventors: David Rosales, Rochester Hills, MI (US); Andrii Levakov, Zubrí (CZ); Kwanggi Lee, Rochester Hills, MI (US)

(73) Assignee: Brose Schließsysteme Gmbh & Co. Kommanditgesellschaft, Wuppertal (DE)

( * ) Notice: Subject to any disclaimer, the term of this patent is extended or adjusted under 35 U.S.C. 154(b) by 0 days.

(21) Appl. No.: 17/691,699

(22) Filed: Mar. 10, 2022

(65) Prior Publication Data

US 2023/0287714 A1    Sep. 14, 2023

(51) Int. Cl.
| | |
|---|---|
| *E05B 81/06* | (2014.01) |
| *E05B 81/14* | (2014.01) |
| *E05B 81/20* | (2014.01) |
| *E05B 81/46* | (2014.01) |
| *E05B 81/90* | (2014.01) |

(52) U.S. Cl.
CPC .............. *E05B 81/06* (2013.01); *E05B 81/14* (2013.01); *E05B 81/20* (2013.01); *E05B 81/46* (2013.01); *E05B 81/90* (2013.01); *E05Y 2900/546* (2013.01)

(58) Field of Classification Search
CPC .......... E05B 81/06; E05B 81/14; E05B 81/20; E05B 81/24; E05B 81/26; E05B 81/30; E05B 81/34; E05B 81/42; E05B 81/46; E05B 81/90; Y10T 292/1047; Y10T 292/1082; Y10S 292/23
See application file for complete search history.

(56) References Cited

U.S. PATENT DOCUMENTS

| | | | |
|---|---|---|---|
| 2016/0153217 A1 | 6/2016 | Mazal | |
| 2016/0312499 A1* | 10/2016 | Fannon | .................. E05B 81/06 |
| 2017/0114576 A1 | 4/2017 | Fuchs | |
| 2017/0159334 A1 | 6/2017 | Ishiguro | |
| 2017/0306658 A1 | 10/2017 | Fuchs et al. | |
| 2018/0087298 A1* | 3/2018 | Strole | .................. B62D 33/037 |
| 2018/0163439 A1 | 6/2018 | Patane et al. | |
| 2018/0291657 A1 | 10/2018 | Strole et al. | |
| 2021/0198924 A1 | 7/2021 | Faitl | |
| 2021/0348426 A1 | 11/2021 | Patane et al. | |
| 2022/0275669 A1* | 9/2022 | Thompson | .............. E05B 81/46 |

FOREIGN PATENT DOCUMENTS

| | | | | |
|---|---|---|---|---|
| CN | 111779381 A | * | 10/2020 | |
| EP | 1045093 A2 | * | 10/2000 | ............. E05B 81/14 |
| WO | WO-0166889 A1 | * | 9/2001 | ............. E05B 81/14 |

* cited by examiner

*Primary Examiner* — Christine M Mills
*Assistant Examiner* — Christopher F Callahan
(74) *Attorney, Agent, or Firm* — Dickinson Wright PLLC

(57) ABSTRACT

A latch assembly for a vehicle closure includes a latch having a catch and a pawl, a clutch, and an electric actuator selectively connected to the latch by the clutch. The electric actuator is configured rotate the pawl out of blocking engagement with the catch to open the latch when the clutch is engaged. A manual release is configured to rotate the pawl out of blocking engage with the catch to open the latch when the clutch is disengaged.

15 Claims, 9 Drawing Sheets

MOTOR VEHICLE LATCH ASSEMBLY WITH MANUAL RELEASE

TECHNICAL FIELD

The present disclosure relates to a motor vehicle latch assembly.

BACKGROUND

Vehicles include closures secured by latches that latch and lock the closures to the vehicle body when the closure is in a partially closed or fully closed position. Certain latches may be configured to provide a number of functions such as power closing, manual closing or locking, power release or opening, manual release, and cinching. Certain closures, such as tailgates used primarily in pickup trucks or vehicles with cargo beds require two latches to secure the tailgate to the truck bed when the tailgate is in the closed or partially closed position.

SUMMARY

According to one embodiment, a latch assembly for a vehicle closure includes a latch, an electric actuator, and a drivetrain including an input operably connected to the electric actuator and an output operably connected to the latch. A clutch configured to selectively couple the input and the output. The clutch includes a coupler fixedly coupled to the output and selectively coupled to the input, wherein the clutch is in an engaged position when the coupler is coupled to the input and is in a disengaged position when the coupler is decoupled from the input. The latch is configured to be opened by the electric actuator when the clutch is engaged. The latch is configured to be manually opened by a person when the clutch is disengaged.

According to another embodiment, a latch assembly for a vehicle closure includes a latch having a catch and a pawl, wherein the catch is rotatable in a closing direction and an opening direction, and the pawl is rotatable between a blocking position in which the pawl restricts rotation of the catch in the opening direction and a free position in which pawl permits rotation of the catch in at least the closing direction. An electric actuator is configured to rotate the catch in the closing direction to close the latch and configured to rotate the pawl out of the blocking position to open the latch. A drivetrain operably couples the electric actuator to the latch and includes a clutch that selectively couples the latch to the electric actuator. The clutch has a coupler that is moveable between a first position in which the clutch is engaged to operably connect the latch and the electric actuator and a second position in which the clutch is disengaged to disconnect the latch and the electric actuator. A manual release includes a user interface connected to the coupler and allowing a user to engage and disengage the clutch. The user interface is coupled to the latch allowing a user to rotate the user interface to rotate the pawl to the free position when the clutch is disengaged to allow manual opening of the latch.

According to yet another embodiment, a latch assembly for a vehicle closure includes a latch having a catch and a pawl, a clutch, and an electric actuator selectively connected to the latch by the clutch. The electric actuator is configured rotate the pawl out of blocking engagement with the catch to open the latch when the clutch is engaged. A manual release is configured to rotate the pawl out of blocking engage with the catch to open the latch when the clutch is disengaged.

DETAILED DESCRIPTION

Figure 1:
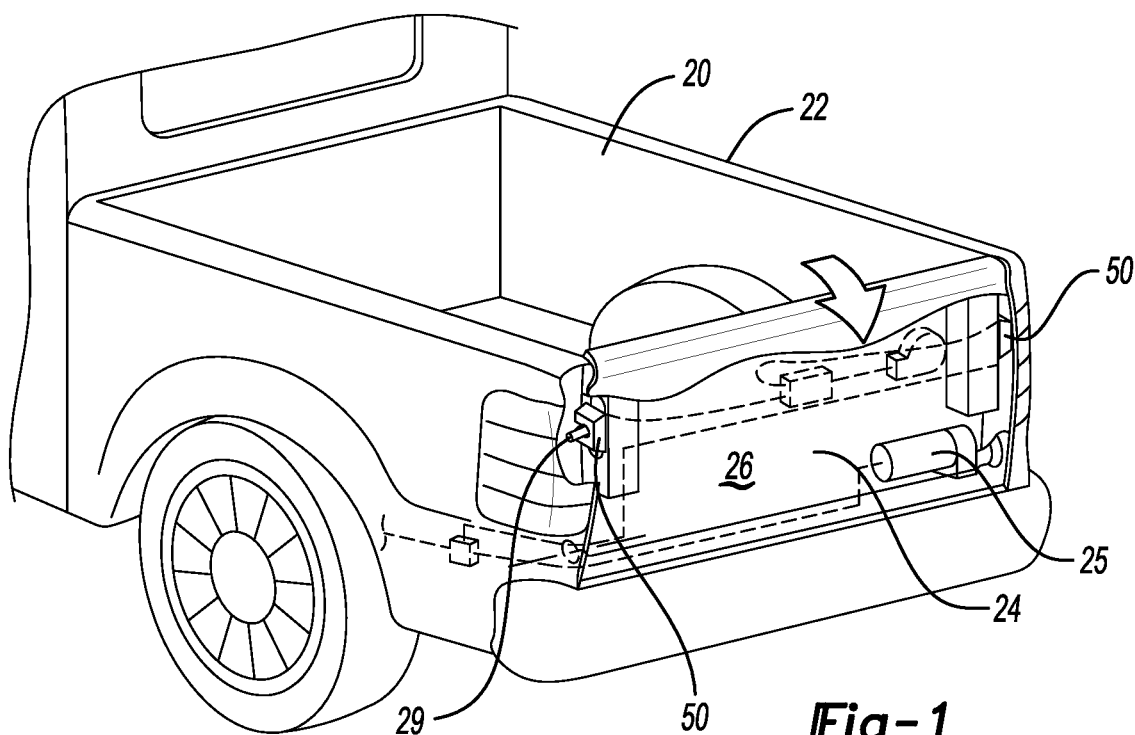
FIG. 1 illustrates a perspective view of an exemplary vehicle and closure.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

This invention is not limited to the specific embodiments and methods described below, as specific components and/or conditions may, of course, vary. Furthermore, the terminology used herein is used only for the purpose of describing particular embodiments of the present invention and is not intended to be limiting in any way.

As used in the specification and the appended claims, the singular form "a," "an," and "the" also contemplates plural referents unless the context clearly indicates otherwise. For example, reference to a component means one or more components. The term "substantially" or "about" may be used herein to describe disclosed or claimed embodiments. The term "substantially" or "about" may modify a value or relative characteristic disclosed or claimed in the present disclosure. In such instances, "substantially" or "about" may signify that the value or relative characteristic it modifies is within ±0%, 0.1%, 0.5%, 1%, 2%, 3%, 4%, 5% or 10% of the value or relative characteristic.

Directional terms used herein are made with reference to the views and orientations shown in the exemplary figures. One or more central axes are shown in the figures and described below. Terms such as "outer" and "inner" are relative to the central axis. For example, an "outer" surface means that the surfaces faces away from the central axis, or is outboard of another "inner" surface. Terms such as "radial," "diameter," "circumference," etc. also are relative to the central axis. The terms "front," "rear," "upper" and "lower" designate directions in the drawings to which reference is made. The terms, connected, attached, etc., refer to directly or indirectly connected, attached, etc., unless otherwise indicated explicitly or by context.

Although the terms first, second, third, etc. may be used to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Vehicles may include a number of closures and a number of latches that are configured to latch and/or lock the closures to the vehicle body. Under certain circumstances, two latches may be required to fix one or more of the closures to the vehicle body. For example, two latches may be required to lock a tailgate, generally used in pickup trucks, to the vehicle body. Certain tailgates, such as those that are powered to move the tailgate e.g., without a user moving manually moving the tailgate may require one or more latches that are powered to move the latch from an open position to a closed position. Because of the weight and kinematics of the tailgate, a relatively large force may be required for the latch to pull the tailgate from the open or partially open position to the fully closed or seated position.

Figure 2:
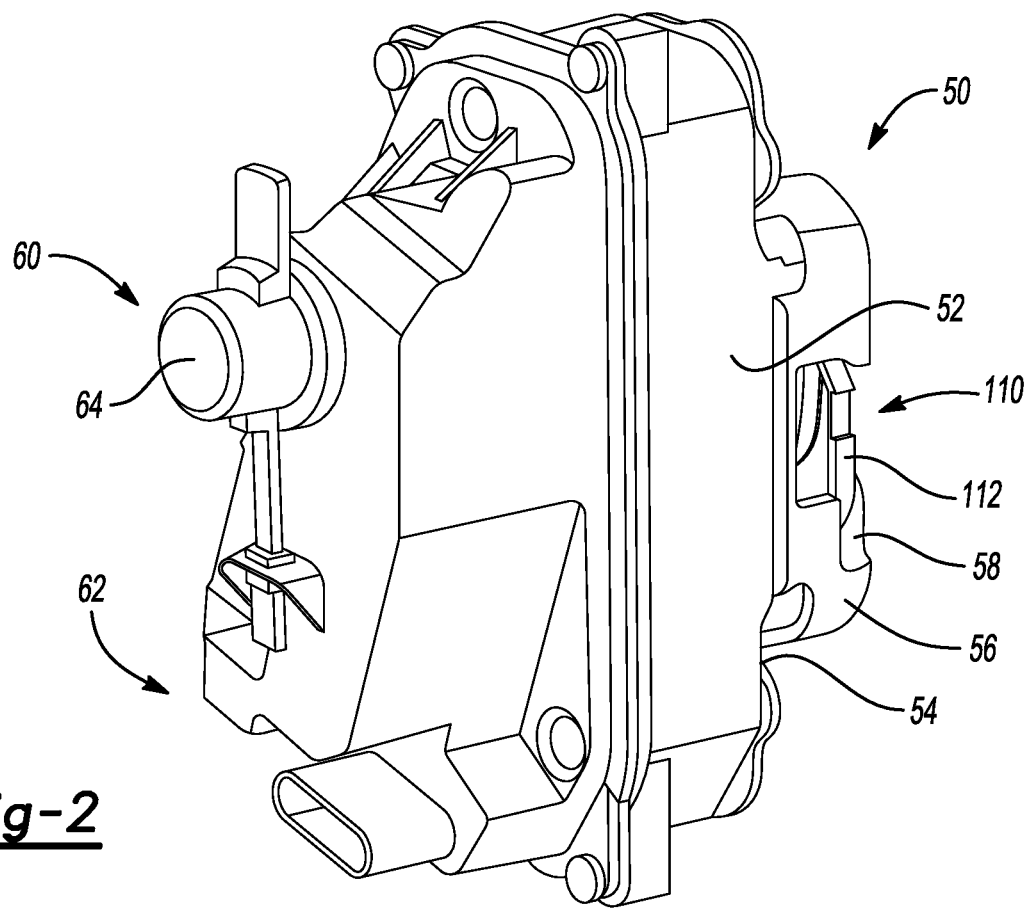
FIG. 2 illustrates a perspective view of a closure latch assembly.

Referring to FIGS. 1 and 2, an exemplary vehicle 20 includes a body 22 and a closure assembly 24. The closure assembly 24 may include a closure 26, that may be configured to move, e.g., pivot with respect to the body 22. The closure assembly 24 may include a power drive 25 that may be configured to move the closure 26 between an open position and a closed position. One or more latch assemblies 50 may be fixed to either the body 22 or the closure 26. As an example, the vehicle 20 may be a pickup truck provided with cargo bed and a tailgate 26. The tailgate 26 may include two latch assemblies 50, one on each side.

The latch assembly 50 is configured to be supported within the closure 26, e.g., tailgate. The assembly 50 includes a housing 52 having attachment features that connect with attachment features within the closure 26 or the body 22 to support the assembly 50. The latch assembly 50 includes a latch 110 disposed on an outer side 54 of the housing 52. The latch 110 is enclosed by a latch cover 56 that includes an opening 58 allowing a post or striker 29 of the vehicle body to be received therein and engage with a catch 112 of the latch 110. The latch assembly 50 is motorized and includes an electric actuator, e.g., an electric motor, that closes the latch 110 by rotating at least the catch 112 relative to the striker 29 and opens the latch 110 by rotating at least a pawl (not visible) to release the catch 112.

The latch assembly 50 operates in conjunction with the power drive 25 to fully close the closure 26. For example, the power drive 25 may pivot the tailgate from the fully open position upwardly to a partially closed position in which the closure 26 is almost seated and the catch 112 is at least partially engaged with the striker 29. At this point, the latch assembly 50 takes over the closing operation and rotates the catch 112 in a closing direction, via the electric actuator, to fully seat the closure 26 and fully latch the latch assembly 50. The pawl is designed to then engage with the catch 112 to maintain the latched or locked position so the electric actuator can be de-energized.

The catch 112 may be biased in an opening direction such that the catch 112 opens when pawl is moved from a blocking position. Thus, the latch 110 may be open by actively moving the pawl from the blocking position and allowing the catch 112 to naturally swing open. The latch assembly 50 also operates in conjunction with the power drive 25 to open the closure 26. For example, responsive to a user request to open the closure 26, the latch assembly 50 rotates the pawl away from the catch, such as via the electric actuator, thus rotating the catch 112, to release the striker 29. Now unlatched, the power drive 25 pivots the closure 26 downwardly towards the open position.

Figure 3A:
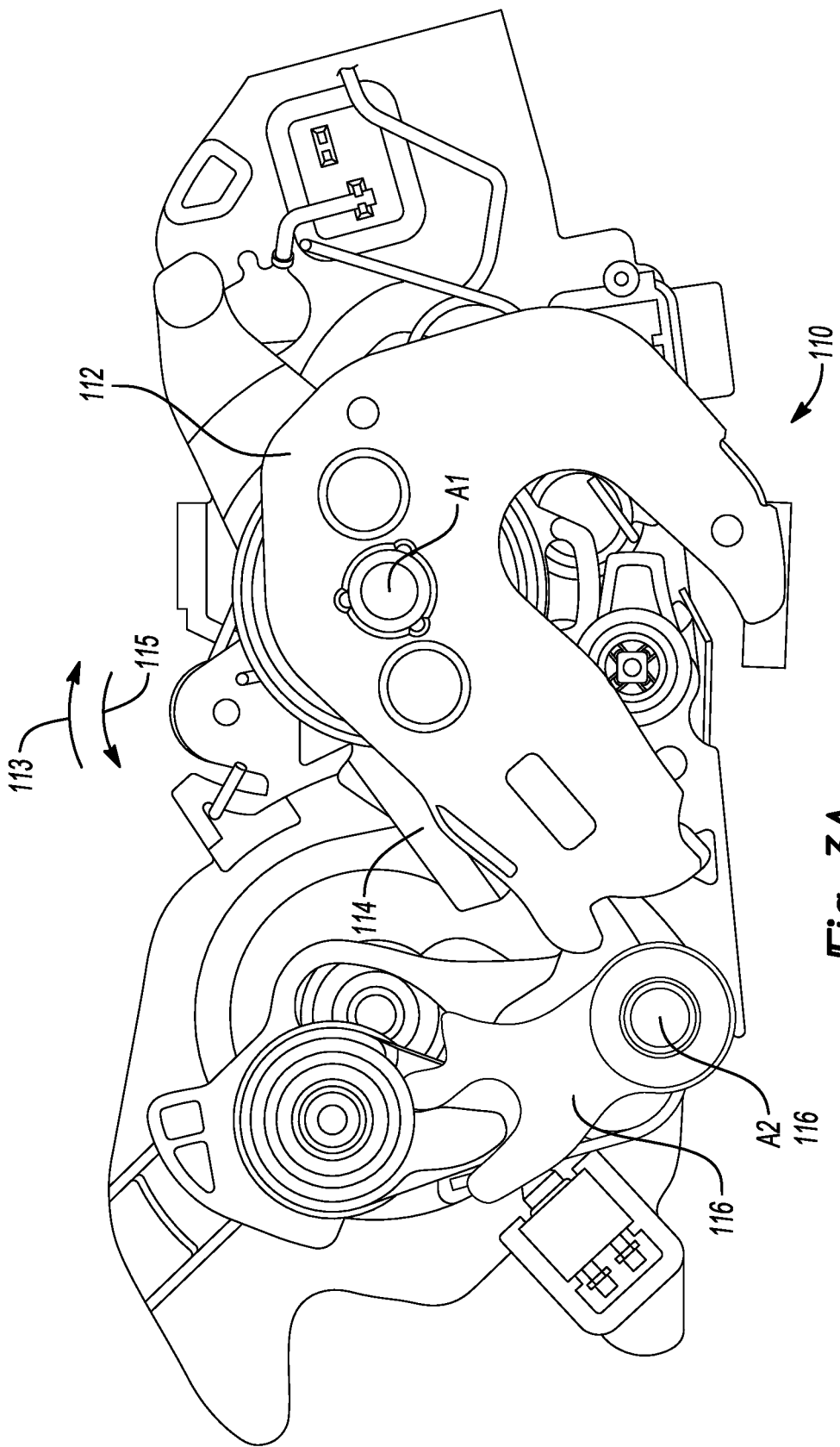
FIG. 3A illustrates a side view of a latch of the latch assembly in an open position.
Figure 3B:
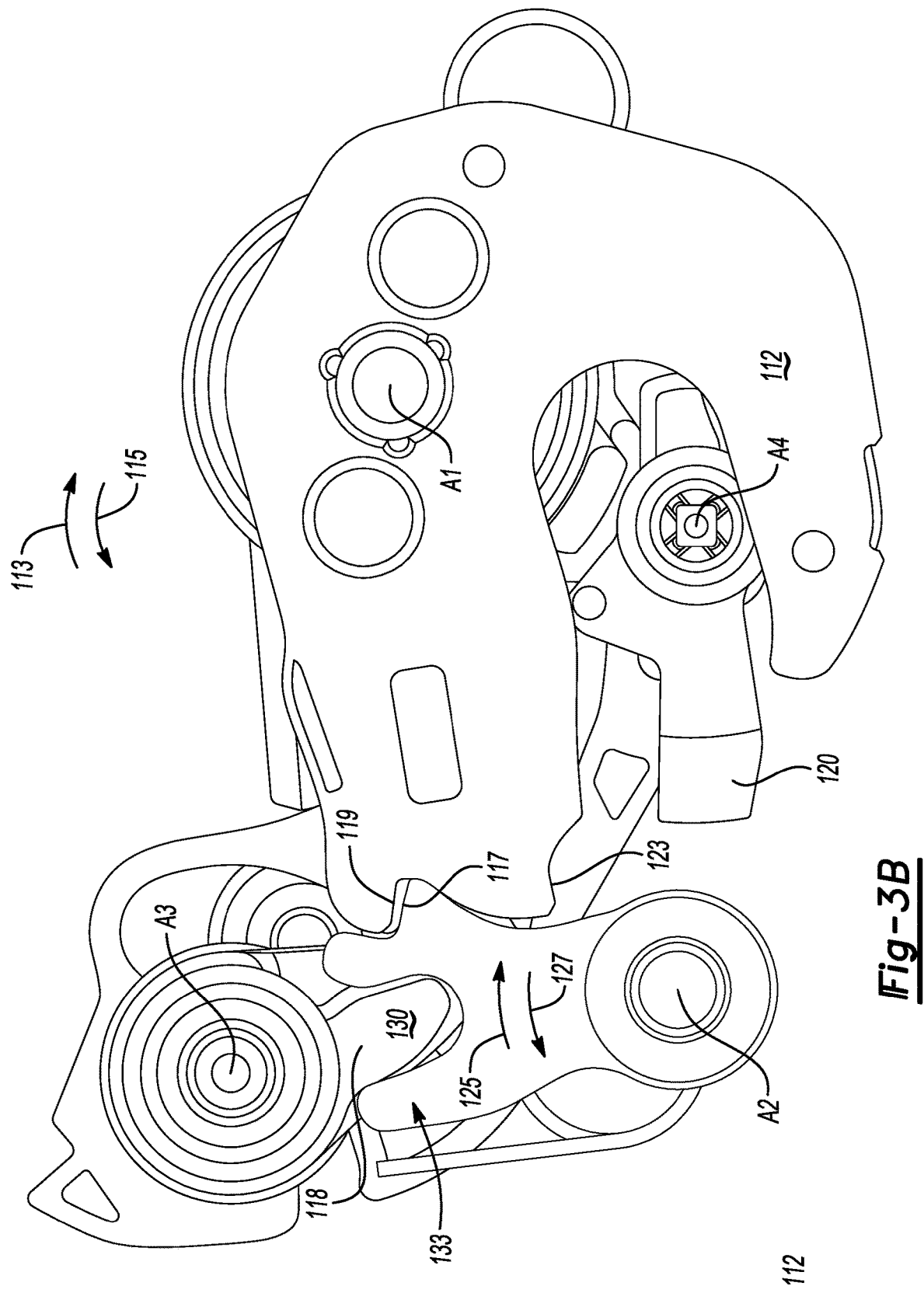
FIG. 3B illustrates a side view of the latch in a partially closed position.
Figure 3C:
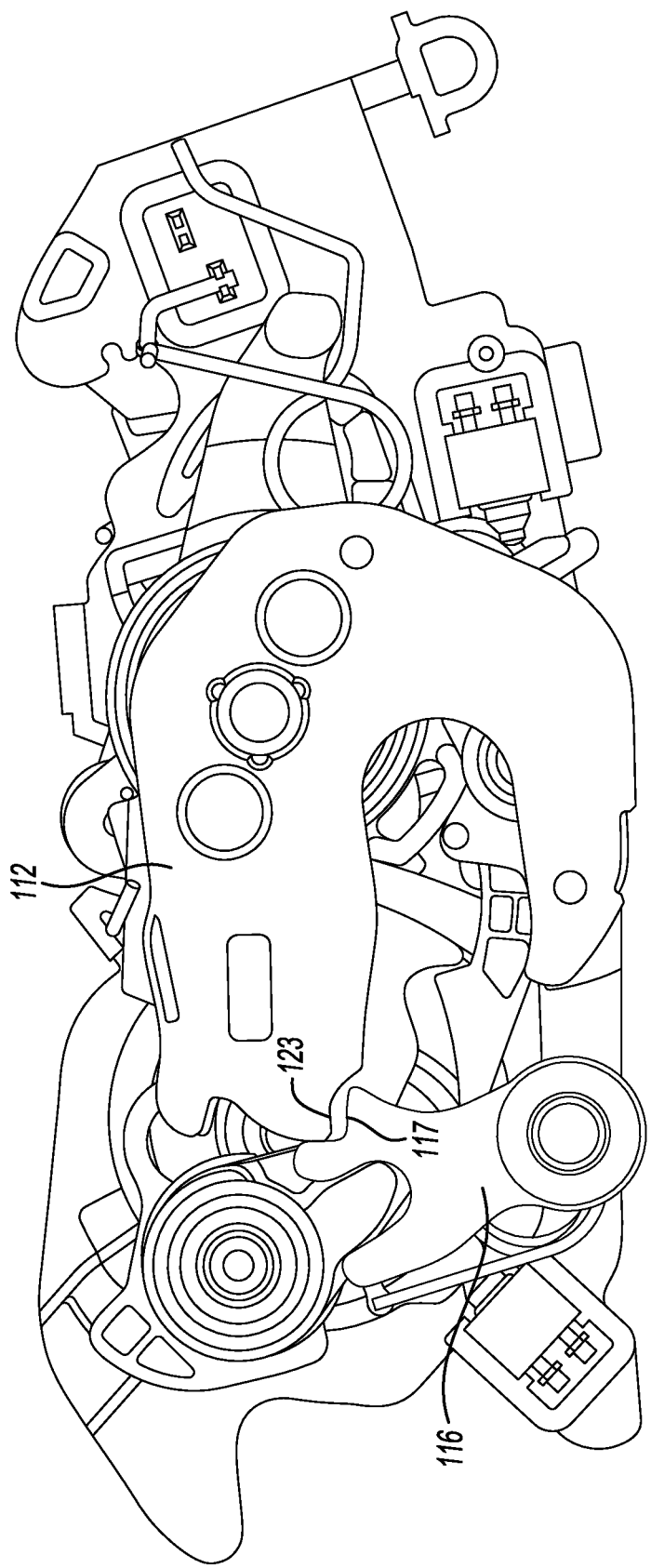
FIG. 3C illustrates a side view of the latch in a fully closed position.

FIGS. 3A-3C illustrate one example arrangement of the latch assembly 50. The latch 110 is configured to latch and/or lock the closure to the body. The catch 112 may be configured to pivot or rotate about a first axis A1 to switch between different positions. The catch 112 includes an open position (FIG. 3A) in which the latch 110 is in an open state and disengaged from the striker 29 and a closed position (FIG. 3B) in which the latch 110 is in the closed state and is engaged with the striker to retain the closure shut. The catch 112 switches between the open position in the closed position by rotating about the first axis A1. The catch 112 moves from the open position to the closed position by rotating in the closing direction 113 (which is clockwise in the illustrated orientation) and moves from the closed position to the open position by rotating in the opening direction 115 (which is counterclockwise in the illustrated orientation). The catch 112 includes an associated clutch lever 114 arranged to pivot about the first axis A1 to rotate the catch 112 between the open position and the closed position. Alternatively, the catch lever 114 may pivot about an axis that is offset from the first axis A1. The catch 112 may be biased towards the open position by one or more resilient members either acting directly or indirectly on the catch. In one embodiment, a pair of springs biases the catch 112 in the opening direction 115.

The latch 110 may include a pawl 116 configured to rotate about a second axis A2. The pawl 116 is configured to engage with the catch 112 to retain the catch in one or more closed positions. For example, the pawl 116 includes a first blocking surface 117 configured to engage with a first detent 119 of the catch 112 to retain the catch 112 in a partially closed position (FIG. 3B). A second detent 123 of the catch 112 to retain the catch in the fully closed position. The pawl 116 is rotatable about the second axis A2 in a blocking direction 125 that brings the pawl 116 into contact with the catch 112 and a free direction 127 that rotates the pawl 116 away from contact with the catch 112. The pawl 116 may be biased in the blocking direction 125 by one or more resilient members acting either directly or indirectly on the pawl 116.

A pawl lever 118 is configured to rotate the pawl 116. The pawl lever 118 may be rotatable about a third axis A3 that is offset relative to the second axis A2. The pawl lever 118 may include an arm 130 that extends from the axis A3 to interact with the pawl 116. For example, the pawl 116 defines a fork 133 that receives the arm 130 therein so that rotation of the pawl lever 118 is input to the pawl 116. Rather than attaching a resilient member to the pawl 116, the pawl lever 118 may be biased to urge the pawl 116 towards the blocking direction.

The geometry of the pawl 116 and the catch 112 may be designed to allow the catch 112 to slide over the pawl 116 in the closing direction 113. However, to reduce the closing effort, the pawl 116 may be rotated and held out of the path of the catch 112 during closing by a blocking lever 120 (sometimes referred to as a coupling lever). The blocking lever 120 holds the pawl 116 away from the catch 112 during closing. The blocking lever 120 may be configured to rotate about a fourth axis A4 and contact and block the pawl lever 118 as the catch 112 rotates from the open position towards the closed position. As stated above, pawl lever 118 and pawl 116 may be biased towards the blocking direction and the blocking lever 120 may be configured to block the pawl 116, by contacting the pawl lever 118, to create a gap between the pawl 116 and the catch 112, so the catch is more easily movable to in the closing direction 113. As an example, the blocking lever 120 forms the gap so that the catch 112 may move towards the closed position without engaging or moving the pawl 116. Avoiding contact with the pawl 116 may result in lower forces required to change the state of the latch 110 to a partially closed or secondary state and a fully closed or primary state. In one or more embodiments, the blocking lever 120 may be arranged with the catch lever 114 so that as the catch lever 114 rotates, the blocking lever 120 also rotates in coordination.

A more in-depth discussion of the latch assembly can be found in application U.S. 60/219,069, filed Jul. 7, 2021, which is hereby incorporated in its entirety by reference herein.

Figure 4A:
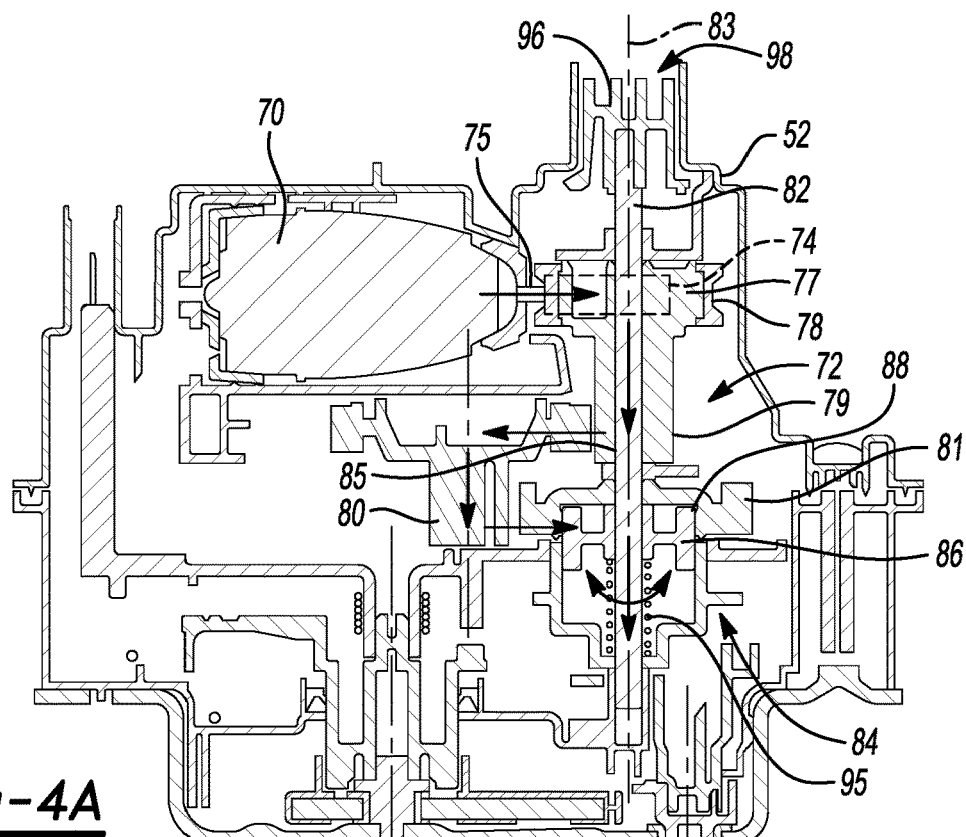
FIG. 4A illustrates a front cross-sectional view of the latch assembly with the clutch in the engaged state.
Figure 4B:
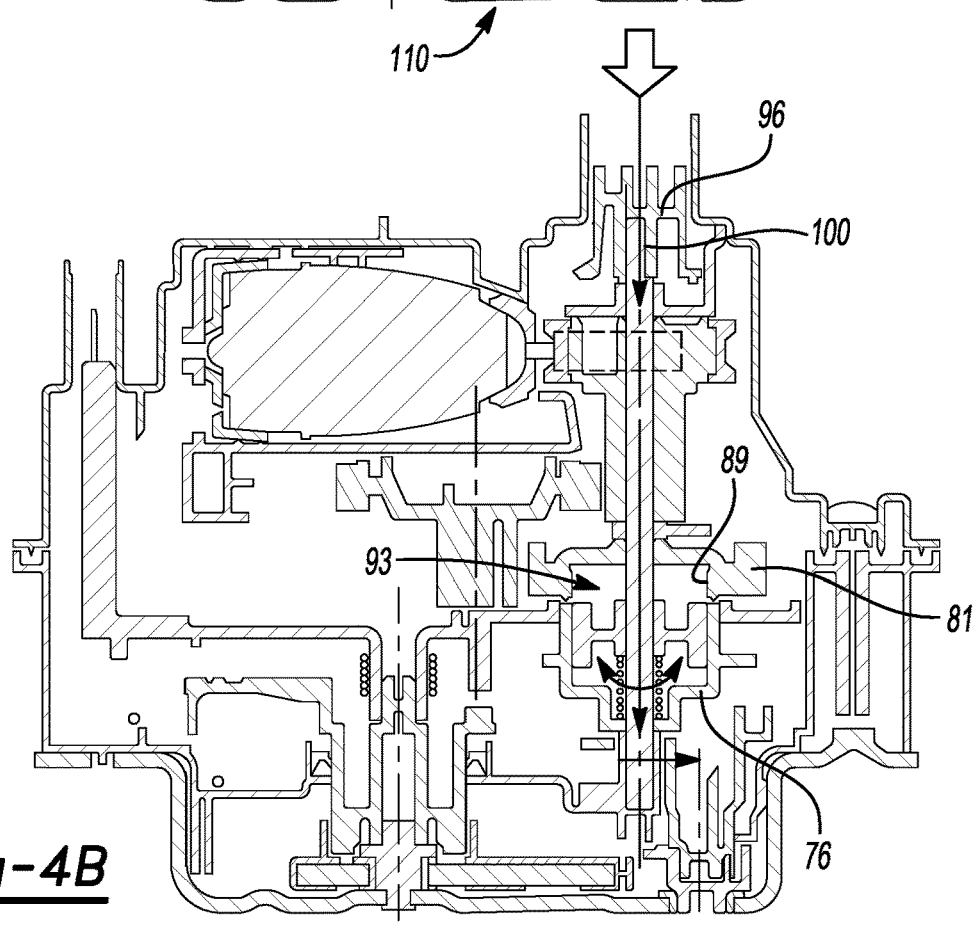
FIG. 4B illustrates a front cross-sectional view of the latch assembly with the clutch in the disengaged state.
Figure 5:
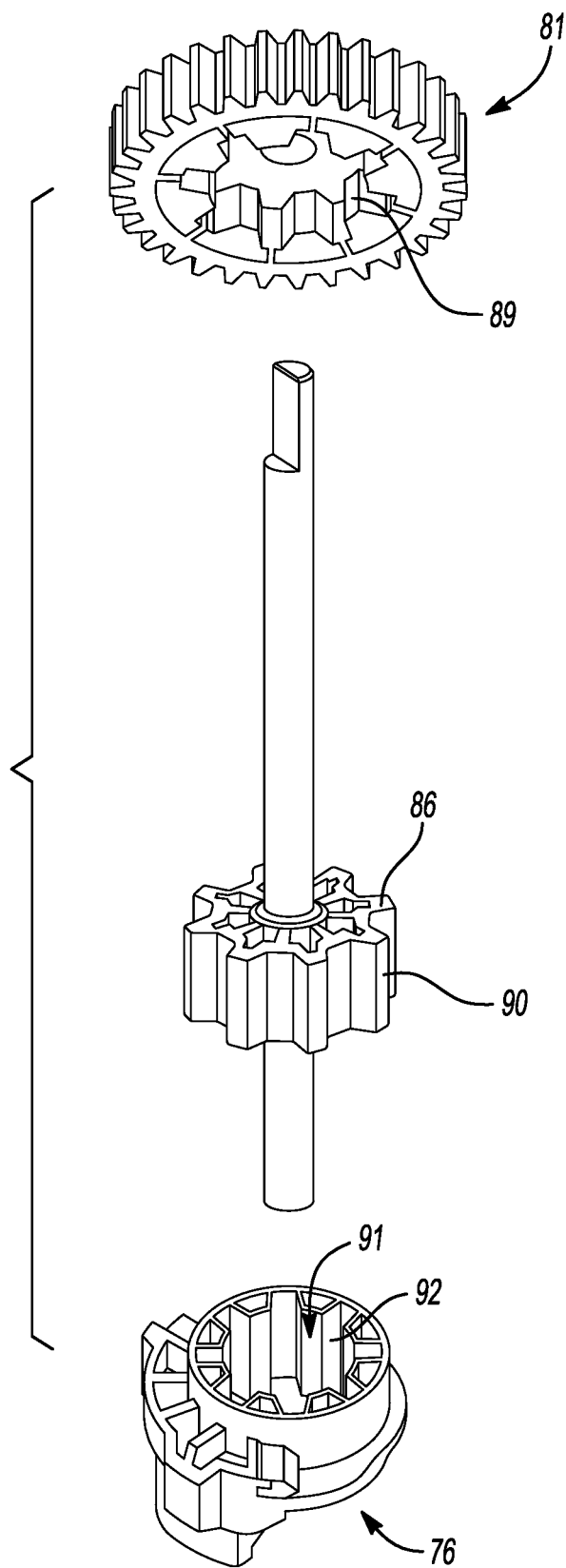
FIG. 5 illustrates a perspective view of a portion of the manual override of the latch assembly.

Referring to FIGS. 4A, 4B, and 5, the latch 110 is operated by an electric actuator 70. The electric actuator 70 may be an electric motor that produces a rotary output, a linear actuator, or any other type of actuator capable of driving a latch. A drivetrain 72, e.g., a gearing arrangement, operably connects the latch 110 to the electric actuator 70. The gearing arrangement may include a plurality of gears configured to multiply the torque between an input 74 and an output 76. Of course, other types of drivetrain may be used to connect between the actuator 70 and the latch 110. In the illustrated embodiment, the input 74 is a worm gear that is fixed on an output shaft 75 of the actuator 70. The input 74 drives a second gear 77, which may be a compound gear having first gear of teeth 78 in meshing engagement with the worm gear 74 and second teeth 79 in meshing engagement with upper teeth of a third gear 80. The gear 80 is also a compound gear having lower gear teeth in meshing engagement with a fourth gear 81. The gears 77 and 81 may be supported to rotate around a shaft 82 defining a first axis of rotation 83. The gears 77 and 81 may be rotatable and axially movable relative to the shaft 82. For example, the gears may define central bores 85 through which the shaft extends. The motor shaft 75 and worm gear 74 may be arranged substantially orthogonal to the axis 83. The third gear 80 may be radially offset from the axis 83 and supported on its own shaft (not shown).

In the illustrated example, the input 74 and the gears 77, 80, and 81 are fixedly coupled to each other. A group of rotating elements are fixedly coupled to one another if they are constrained to rotate as a unit in all operating conditions. Rotating elements can be fixedly coupled by spline connections, gear mesh, welding, press fitting, machining from a common solid, or other means. Slight variations in rotational displacement between fixedly coupled elements can occur such as displacement due to lash or shaft compliance. In contrast, the output 76 is selectively coupled to the gear 81. Two or more rotating elements are selectively coupled, such as by a clutch, when the clutch constrains them to rotate as a unit whenever it is fully engaged and they are free to rotate at distinct, unrelated speeds in at least some other operating condition. Two elements are coupled if they are either fixedly coupled or selectively coupled.

The gear 81 is selectively coupled to the output 76 by a clutch 84. The clutch 84 may be a dog clutch. The clutch 84 may include a coupler 86 that is fixed to the shaft 82 both rotationally and axially. The coupler 86 is configured to engage with the gear 81 and the output 76. When the clutch 84 is engaged, the gear 81 is coupled to the output 76 by the coupler 86, and, when the clutch 84 is disengaged, the output 76 is not coupled to the gear 81. When the clutch is disengaged, the drivetrain or gearing arrangement may be referred to as being in NEUTRAL or in the manual-actuation position as the output 76 is now decoupled from the electric actuator 70.

In the illustrated embodiment, the clutch 84 is coaxial with the shaft 82, e.g., concentric with the axis 83, as is internal to the gear 81 and the output 76. The gear 81 may define an interior 88 having internal splines, gear teeth, or the like 89 that are configured to engage with external splines, gear teeth, or the like 90 of the coupler 86. The output 76 also defines an interior 91 having internal splines, gear teeth, or the like 92 configured to engage with the splines, gear teeth, or the like of the coupler 86. When fully assembled, the interior 88 and the interior 91 come together to define a clutch chamber 93 that houses the coupler 86 such that the coupler is able to move along the axis 83 by translating the shaft 82. The chamber 93 has an axial length that is greater than the axial length of the coupler 86 so that the coupler has sufficient travel to engage and disengage the gear 81. In the illustrated embodiment, the output 76 has a deeper interior 91 and receives the coupler 86 when the clutch 84 is disengaged. Here, the coupler 86 is always coupled with the output 76 and is selectively coupled with the gear 81 to engage the clutch 84. That is, the coupler 86 moves downwardly and into the interior 91 to disengage the clutch 84 and moves upwardly to recouple with the gear 81 to engage the clutch 84. A spring 95 may bias the coupler 86 and shaft 82 upwardly to the engaged position. That is, the clutch 84 is biased engaged.

The illustrated internal clutch 84 may provide for a smaller package than, for example, an external clutch, however, this disclosure is not limited to the shown design and an external clutch may be advantageous in some implementations. As such, this disclosure contemplates a clutch in which the coupler is external to the gear and the output. Moreover, the clutch 84 is not limited to the above-described dog clutch and may be any mechanism configured to selectively couple the output with the electric actuator.

Figure 6:
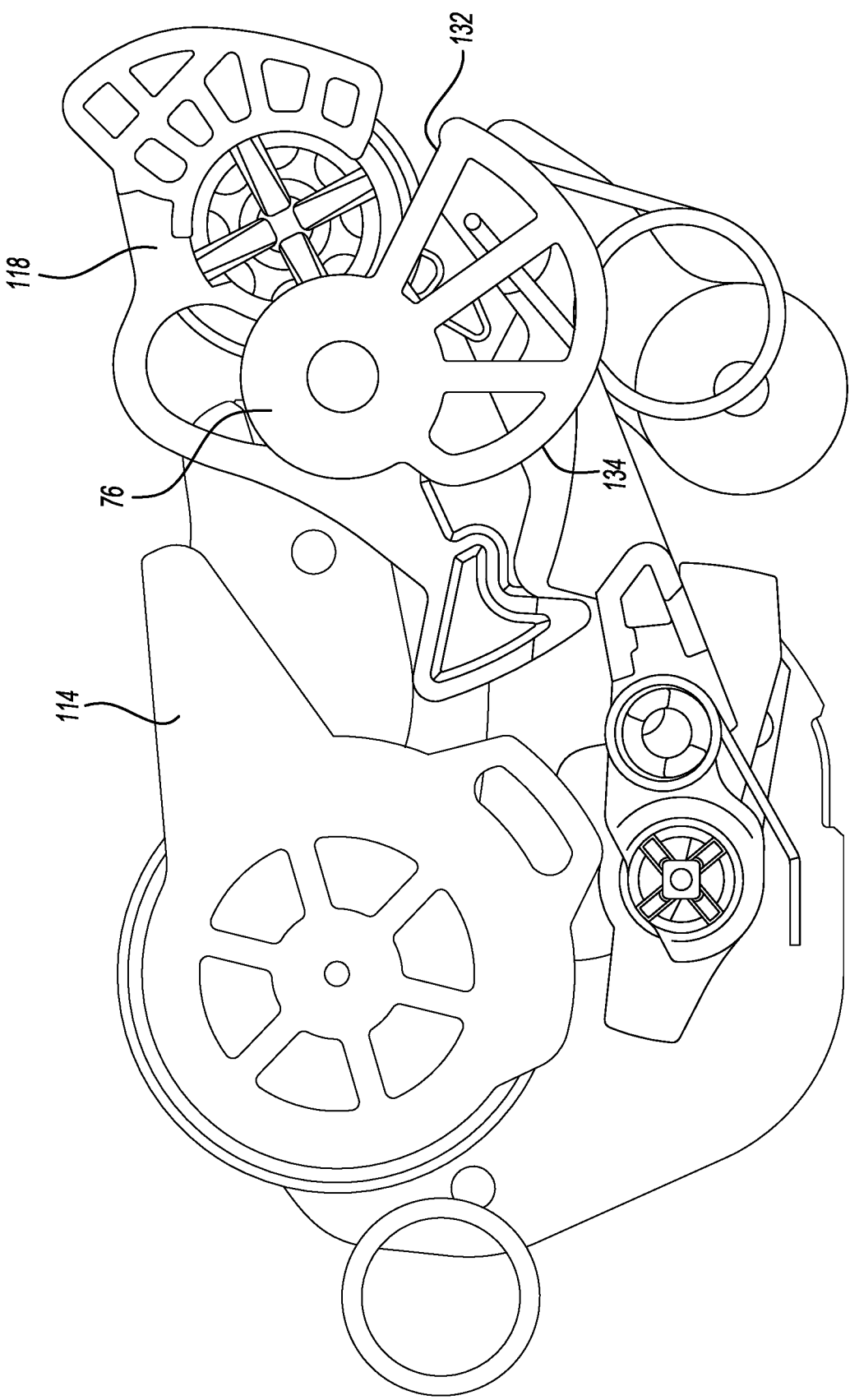
FIG. 6 illustrates a side cross-sectional view of the latch assembly.

Referring to FIG. 6, the output 76 is configured to engage with the catch lever 114 and the pawl lever 118 so that the catch 112 and the pawl 116 can be actuated by the electric actuator 70 during normal operation and can be manually operated if needed. The output 76 may be configured to engage with the catch lever 114 and the pawl lever 118 at separate times. That is, during latch, the output 76 drives the catch lever 114 to close the catch 112, and during unlatch, the output 76 drives the pawl lever 118 in the free direction allowing the spring bias to pivot the catch 112 open. The output 76 may define a first cam 132 configured to engage with the pawl lever 118 and a second cam 134 configured to engage with the catch lever 114. The output 76 may include a home position (shown) in which the output 76 is engaged with neither lever. The first cam 132 engages with the pawl lever 118 when the output 76 is rotated in the counterclockwise direction to actuate the pawl 116. The second cam 134 engages with the catch lever 114 when the output 76 is rotated clockwise to actuate the catch 112. That is, the electric actuator 70 may be used to close the catch 112 by rotating the output 76 in the clockwise direction. Likewise, the electric actuator may be used to open the latch by rotating the output 76 in the counterclockwise direction to disengage the pawl 116 from the catch 112. Once the appropriate action is taken, the electric actuator 70 may rotate the output 76 back to the home position until a new action is requested.

Described above is the normal operation of the latch assembly 50 in which the electric actuator 70 is used to operate the catch 112 closed and to operate the pawl 116 to unlatch the catch. Given the arrangement of the electric actuator 70 and the drivetrain 72, the pawl 116 may become stuck in the blocking position if the electric actuator or driveline becomes frozen. This hinders the ability to open the closure 26. To avoid this, the latch assembly 50 includes a manual release or override that allows for the latching and unlatching of the closure 26 in the event that the electric actuator or drivetrain becomes inoperable.

Referring to FIGS. 2 and 4A-4B, the manual override includes an access point 60 on an interior side of the housing 52. The closure 26 may include an access panel allowing a technician to access the manual override. The access point 60 may include a removable cover 64, that once removed, reveals a user interface used to decouple the latch 110 from the electric motor 70 (i.e., place the drivetrain in NEUTRAL) and allow manual actuation of the latch 110 to manually unlatch the closure 26. For example, the user interface may be a depressible and rotatable button 96. To manually operate the latch 110, a technician may depress the user interface 96 to disengage the clutch 84, e.g., decouple the actuator 70 and the latch 110. Once the drivetrain is in NEUTRAL, a technician may rotate the user interface 96 to at least move the pawl 116 in the free direction allowing for the manual unlatching of the closure 26. The technician may also rotate the user interface 96 in the opposite direction to latch the closure 26.

During normal operation of the closure 26 and the latch assembly 50, the clutch 84 is biased engaged to couple the output 76 to the actuator 70 (FIG. 4A). The output 76 is operably connected to the latch 110 as described above. The latch 110 is opened by energizing the actuator 70 to drive the pawl lever 14, which in turn rotates the pawl 116 in the free direction 127, out of the blocking position, and allowing the catch 112 to open. If, for any reason, the actuator 70 becomes nonfunctional, the manual override can be used to disengage the clutch 84 thus decoupling the actuator 70 (and some parts of the drivetrain) from the output 76 and allowing the user to manually rotate the output 76 to operate the pawl 116.

The manual override generally includes the access point 60, the user interface 96, the shaft 82, and the coupler 86. The housing 52 defines an opening 98 that receives the button 96 therein. The button 96 floats within the opening 98 so that the button 96 can be moved up-and-down and rotated relative to the housing 52. The button 96 is supported on the shaft 82 and defines a central hole 100 that receives an upper end of the shaft 82 therein. The button 96 is fixed to the shaft 82. The manual override is operated by pushing on the button 96, which causes the entire shaft assembly including the coupler 86 to move downwardly compressing the spring 95. This axial movement of the button 96 and the shaft 82 places the clutch 84 in the disengaged position thus placing the drivetrain in NEUTRAL. Now, the latch 110 can be manually operated by rotating the button 96. As shown in FIG. 4B, a technician may operate the manual override by depressing the button 96 causing the shaft 82 and the coupler 86 to travel downwardly along the axis 83. This action releases the coupler 86 from the gear 81 thus decoupling the output 76 from the inoperative actuator 70 or driveline. The technician may then rotate the button 96 as desired to operate the latch 110.

Figure 7:
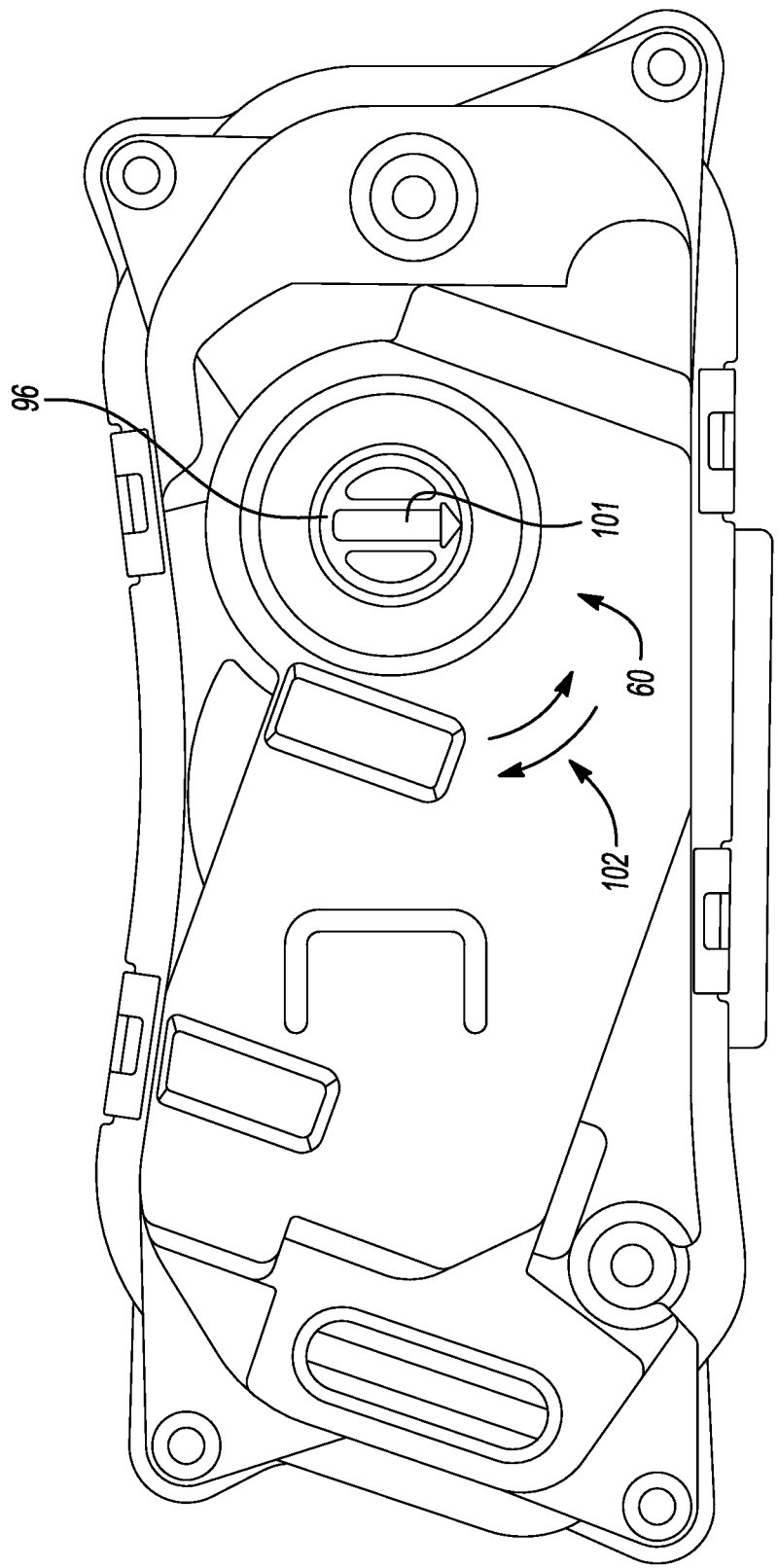
FIG. 7 a side view of a housing of the latch assembly.
Figure 8:
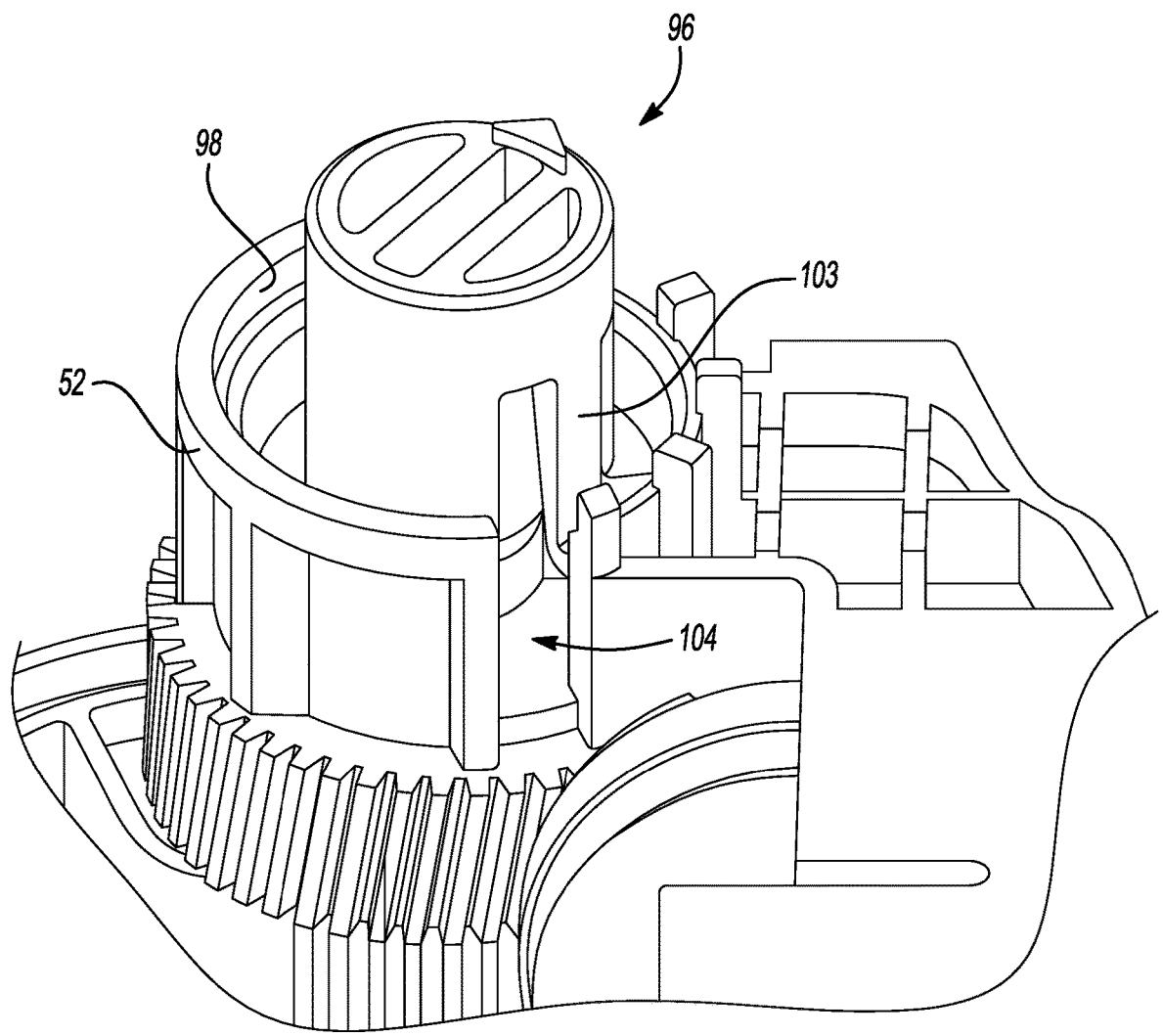
FIG. 8 is a perspective view of a user interface of the manual override of the latch assembly.

FIGS. 7 and 8 show the user interface 96 and the access point 60 of the housing 52. The user interface 96 includes a feature or interface 101 configured to receive or engage a tool for depressing and operating the button 96. The feature 101 may be a tool receptacle. For example, the button 96 may include a flat, a Philips, an Allen, an external hex, a torx, or similar receptacle configured to receive a corresponding bit of a tool. The button 96 may be hidden and protected by the cover 64. The housing 52 may include indicia 102 that provides instructions for the manual override. For example, the indicia 102 may include instructions for performing the manual override, arrows/text guiding the technician as to which direction to rotate the button 96 in order to latch and unlatch the latch 110, a home indicator, etc.

The housing 52 may define a slot 104 at the opening 98 that cooperates with a clip 103 of the button 96. The button 96 may be plastic and the clip 103 may be an integrally formed feature of the button 96. The slot 104 extends in the axial direction of the axis 83. The slot 104 may be in the shape of an elongate rectangle. The clip 103 normally floats above the slot 104 and is designed to reside within the slot when the button 96 is depressed.

The clip 103 is aligned with the slot 104 when the manual override is in the home position. When in the home position, the clip 103 is not deformed due to the clearance provided by the slot 104. The clip 103 is designed to deflect radially inward towards the axis 83 in response to the button 96 being depressed and rotated out of the home position (leaving the slot 104), and is designed to snap back to its undeflected position within slot 104 in response to the button 96 being placed into the home position. The snapping action of the clip 103 provides a tactile and audible indicator to the technician that the button 96 has been returned to the home position following a manual opening procedure.

The above-described latch assembly provides a compact and cost-efficient solution for power driven closures such as tailgates. The latch assembly allows for electric opening and closing of the closure while also providing manual operation if needed. While the latch assembly was described primarily in conjunction with an example truck tailgate, the latch assembly may be used in any closure.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

PARTS LIST 14 pawl lever
20 vehicle
22 body
24 closure assembly
25 power drive
26 tailgate
26 closure
29 striker
50 latch assembly
52 housing
54 outer side
56 latch cover
58 opening
60 access point
64 cover
70 electric actuator
72 drivetrain
74 input
75 output shaft
76 output
77 second gear
78 teeth
79 second teeth
80 third gear
81 fourth gear
82 shaft
83 axis
83 rotation
84 clutch
85 central bores
86 coupler
88 interior
89 spline
90 spline
91 interior
93 clutch chamber
95 spring
96 user interface
98 opening
100 central hole
101 interface
102 indicia
103 clip
104 slot
110 latch
112 catch
113 closing direction
114 catch lever
115 opening direction
116 pawl
117 first blocking surface
118 pawl lever
119 first detent
120 lever
123 second detent
127 free direction
130 arm
132 first cam
133 fork
134 second cam

What is claimed is:

1. A latch assembly for a vehicle closure comprising:
a latch;
an electric actuator;
a drivetrain including an input operably connected to the electric actuator and an output operably connected to the latch; and
a clutch configured to selectively couple the input and the output and including a coupler fixedly coupled to the output and selectively coupled to the input, wherein the clutch is in an engaged position when the coupler is coupled to the input and is in a disengaged position when the coupler is decoupled from the input; and
a manual release that is fixedly coupled to the output and is selectively coupled to the electric actuator by the clutch such that rotation inputted to the manual release, when the clutch is disengaged, rotates the output to manually open the latch, wherein
the latch is configured to be opened by the electric actuator when the clutch is engaged,
the latch is configured to be manually opened by a person when the clutch is disengaged,
the manual release includes a user interface and a shaft connecting the user interface to the coupler, wherein the coupler is fixed to the shaft, and
wherein the user interface is a button that is fixed to the shaft.

2. The latch assembly of claim 1, wherein the output is concentric with the shaft.

3. The latch assembly of claim 1 further comprising:
a housing defining a hole; and
a user interface defining a tool interface and supported withing the hole such that the user interface is depressible and rotatable relative to the housing, wherein user interface is operably connected to the coupler such that depression of the user interface actuates the clutch to the disengaged position and such that rotation of the user interface, while depressed, rotates the coupler to rotate the output allowing manual opening of the latch.

4. The latch assembly of claim 3 further comprising a shaft connected between the user interface and the coupler, wherein the user interface and the coupler are fixed to the shaft.

5. The latch assembly of claim 1, wherein the output defines teeth that engage with teeth of the coupler.

6. The latch assembly of claim 1, wherein the output defines first internal teeth and the coupler defines external teeth that are in continuous engagement with the first internal teeth, wherein the drivetrain further includes a gear fixedly coupled to the input and defining second internal teeth that engage with the external teeth when the clutch is in the engaged position and that do not engage with the external teeth when the clutch is in the disengaged position.

7. The latch assembly of claim 1, wherein the latch includes a catch rotatable to a closed position and a pawl rotatable from a free position to a blocking position that retains the catch in the closed position, wherein the output is selectively coupled to the pawl such that rotation of the coupler, by the person when the clutch is disengaged, in a first direction rotates to pawl to the free position to manually open the latch.

8. A latch assembly for a vehicle closure comprising:
a latch including a catch and a pawl, wherein the catch is rotatable in a closing direction and an opening direction, and wherein the pawl is rotatable between a blocking position in which the pawl restricts rotation of the catch in the opening direction and a free position in which pawl permits rotation of the catch in at least the closing direction;
an electric actuator configured to rotate the catch in the closing direction to close the latch and configured to rotate the pawl out of the blocking position to open the latch;
a drivetrain operably coupling the electric actuator to the latch and including a clutch that selectively couples the latch to the electric actuator, the clutch including a coupler that is moveable between a first position in which the clutch is engaged to operably connect the latch and the electric actuator and a second position in which the clutch is disengaged to disconnect the latch and the electric actuator; and
a manual release including a user interface connected to the coupler allowing a user to engage and disengage the clutch, wherein the user interface is coupled to the latch allowing a user to rotate the user interface to rotate the pawl to the free position when the clutch is disengaged to allow manual opening of the latch,
wherein the manual release further includes a shaft connected between the user interface and the coupler, wherein movement of the user interface in an axial direction of the shaft moves the coupler between the first and second positions, and
wherein the drivetrain includes a gear defining a bore that receives the shaft therethrough, wherein the gear is rotationally and axially movable relative to the shaft.

9. The latch assembly of claim 8, wherein the user interface is rotationally fixed relative to the coupler.

10. The latch assembly of claim 9, wherein the user interface is axially fixed relative to the coupler, wherein the coupler moves between the first and second positions by depressing the user interface.

11. The latch assembly of claim 8, wherein the coupler is concentric with the shaft.

12. The latch assembly of claim 8, further comprising a housing defining an opening, wherein the user interface includes a button supported within the opening and depressible and rotatable relative to the housing, and wherein the button defines a tool interface.

13. The latch assembly of claim 8, wherein the drivetrain includes an input drivable by the electric actuator and an output selectively coupled to the input by the clutch, wherein the coupler is fixedly coupled to the output and is selectively coupled to the input.

14. The latch assembly of claim 13, wherein the output includes a first cam selectively coupled to the catch when the output rotates in a first direction to rotate the catch in the closing direction to close the latch and a second cam selectively coupled to the pawl when the output rotates in a second direction to rotate the pawl towards the free position to open the latch.

15. A latch assembly for a vehicle closure comprising:
a latch including a catch and a pawl;
a clutch;
an electric actuator selectively connected to the latch by the clutch, the electric actuator being configured rotate the pawl out of blocking engagement with the catch to open the latch when the clutch is engaged; and
a manual release including a shaft and a button, the button fixed to the shaft and the shaft operatively connected to the clutch and wherein axial movement and rotational movement of the button and the shaft rotates the pawl out of blocking engagement with the catch to open the latch when the clutch is disengaged.

* * * * *